Jan. 13, 1942.                    J. E. HINES                    2,270,004
                              AUTOMOBILE JACK
                            Filed June 9, 1941                2 Sheets-Sheet 1
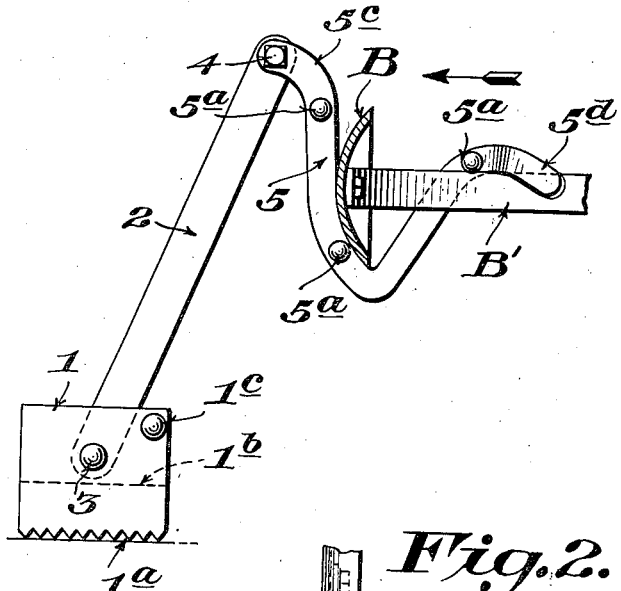
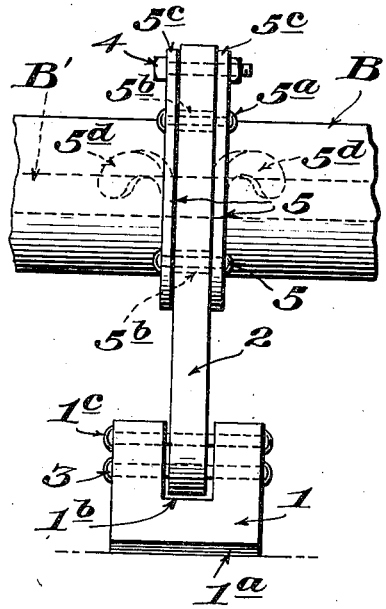
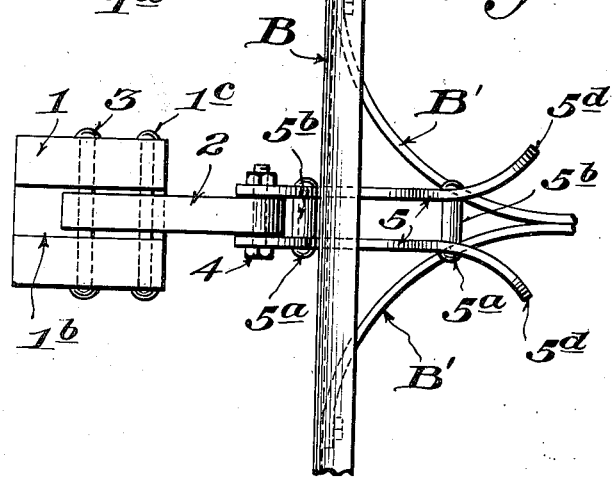
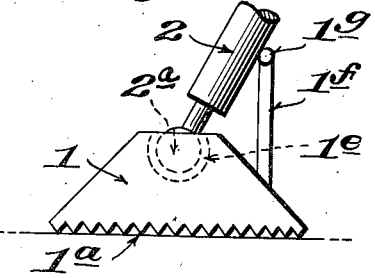
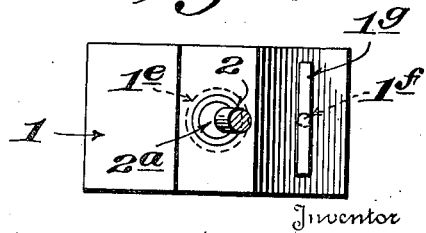
Inventor
John E. Hines
By Dowell & Dowell
Attorneys Jan. 13, 1942.   J. E. HINES   2,270,004
AUTOMOBILE JACK
Filed June 9, 1941   2 Sheets-Sheet 2
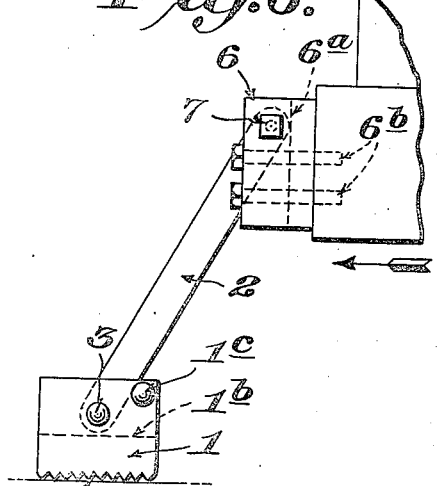
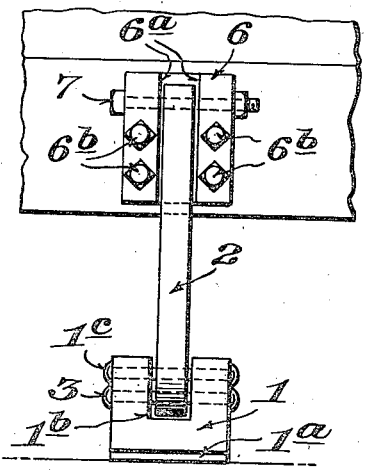
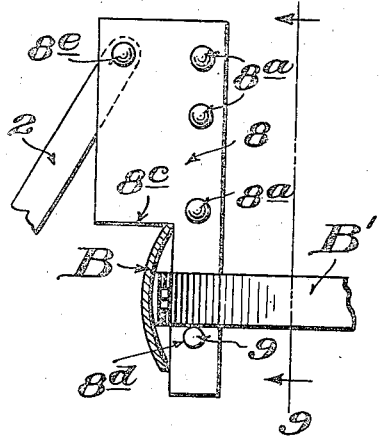
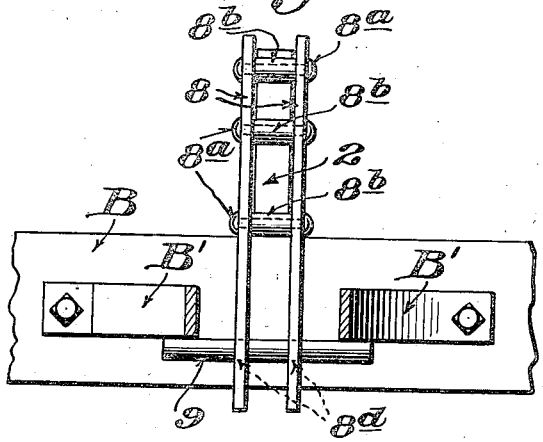
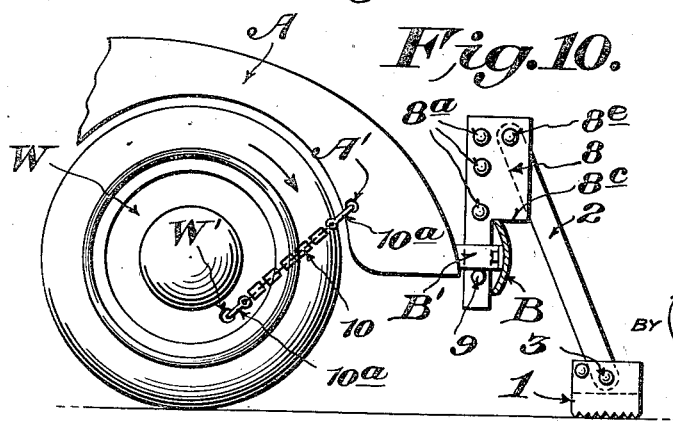
Inventor
John E. Hines
BY
Dowell & Dowell
Attorneys Patented Jan. 13, 1942

2,270,004

UNITED STATES PATENT OFFICE 2,270,004

AUTOMOBILE JACK

John E. Hines, Rochester, Minn.

Application June 9, 1941, Serial No. 397,300

11 Claims. (Cl. 254—94)

This invention is a novel improvement in automobile jacks, and the principal object thereof is to provide a jack which when applied to the bumper or body of an automobile, and the automobile moved a short distance, forwardly or backwardly, will raise the body and wheel of the automobile adjacent the jack above the ground surface, my invention thus utilizing the motor of the automobile itself to provide the necessary power for raising the body and wheel above the ground to permit changing of tires, the application of non-skid chains, or small repairs, my invention thus dispensing with the necessity for manually actuating a jack to raise the body or wheel.

Another object of the invention is to provide an automobile jack of the above type consisting of a base on which a swinging bar is mounted, either pivotally or by ball-and-socket joint, said bar being normally inclined to the road surface, and having removably secured thereto at its upper end a preformed novel bracket adapted to be secured in rigid position on the bumper without the use of bolts, screws or other extraneous devices and in such manner as to either underlie the bumper bar and to overlie the bumper brace rods, or to overlie the bumper bar and underlie the bumper brace rods, whereby when so applied, upon movement of the automobile, the bar of the jack will be shifted into vertical position thereby raising the adjacent portion of the automobile body, and the adjacent wheel above the ground surface.

A further object of the invention is to provide a jack adapted to be connected with brackets which may be permanently secured to the ends of an automobile body so as to form integral parts thereof, or to brackets which may be removably secured by bolts or screws to the ends of said body, said brackets each having a bore adapted to receive a bolt which secures the upper end of the swinging bar of the jack thereof, so that when it is desired to raise a corner or side of an automobile body and its adjacent wheel, all that is necessary is to position the jack opposite the desired bracket and to secure the upper end of the swinging bar of the jack in the bracket, and then move the automobile under its own power to swing the bar from its normal tilted position into substantially vertical position.

A still further object of the invention is to provide simple and efficient means supplementing the use of the jack itself for preventing rotation of a drive wheel of an automobile of the conventional two-wheel drive, when said drive wheel is being raised, said means connecting the wheel and body in a manner which will prevent spinning of said wheel as it leaves the ground or road surface while being raised, thereby permitting the opposite drive wheel to move the vehicle to shift the swinging bar of the jack into substantially raised position.

Other minor objects of the invention will be hereinafter set forth.

I will explain the invention with reference to the accompanying drawings, which illustrate several practical embodiments thereof, to enable others to adopt and use the same; and will summarize in the claims, the novel features of construction, and novel combination of parts, for which protection is desired.

In said drawings:

Fig. 1 is a side elevation showing one embodiment of my novel jack applied to a conventional front or rear bumper bar of an automobile.

Fig. 2 is a top plan view of the parts shown in Fig. 1.

Fig. 3 is a front elevation of the parts shown in Fig. 1.

Fig. 4 is a side elevation of a modified form of jack having a ball-and-socket joint connecting the swinging bar and the base of the jack.

Fig. 5 is a top plan view of the parts shown in Fig. 4.

Fig. 6 is a side elevation of a modified form of bracket for the jack, showing the bracket secured directly to the body of the automobile at the front or rear end thereof.

Fig. 7 is a front elevation of the parts shown in Fig. 6.

Fig. 8 is a further modification showing a different form of bracket for the jack, showing same secured to a conventional bumper of an automobile at the front or rear end thereof.

Fig. 9 is a section on the line 9—9, Fig. 8.

Fig. 10 is an elevation showing my novel auxiliary means for preventing rotation of a wheel of the automobile which is to be raised, when said wheel constitutes one of the drive wheels of the automobile.

As shown in Figs. 1, 2 and 3, the jack preferably comprises a base 1 having a roughened lower face 1a, preferably serrated or scored, adapted to seat directly upon the road or ground surface. In the upper end of the base 1 is a slot 1b adapted to receive the lower end of a swingable lifting bar 2 pivoted on a bolt or pin 3 extending through the sides of the block and through slot 1b. Extending through the inner end of slot 1b is a pin or bolt 1c adapted to limit the swinging movement of bar 2 and to maintain said bar in normal inclined position when the base is seated on the road or ground.

The upper end of bar 2 is perforated to receive a bolt 4 which pivotally secures the bar to a preformed bracket which is applied to the conventional front or rear bumper bar B of the vehicle and which usually consists of a heavy bar B extending across the front or rear end of the vehicle projecting beyond the ends of the body thereof, said bumper being secured to the body by means of bumper braces B' which, as shown in Fig. 2, are disposed in pairs which diverge outwardly usually on an arc so as to be tangent to the bumper bar B at their outer ends and to be contacting at their inner ends adjacent the body of the vehicle, the outwardly flaring pairs of brace rods B' forming with the bumper bar B a substantially triangular opening between the rear face of bumper bar B and the inner faces of braces B' which space is adapted to receive my novel bracket, as hereinafter described.

As shown in Figs. 1, 2 and 3, the bracket preferably consists of a pair of spaced parallel substantially V-shaped bars 5, 5 secured in spaced relation by means of rivets 5a passing through the bars 5 and through spacing washers 5b disposed between bars 5, 5, said bolts being disposed preferably at points adjacent the apex of the V-shaped bars 5 and adjacent the upper ends of the legs thereof, as indicated in Fig. 1, said rivets 5a and washers 5b connecting the bars 5 to form a rigid structure. The upper end of one of the legs of the V-shaped bracket 5, 5, is flared outwardly as at 5c, and is perforated to receive the bolt 4 which secures the upper end of the lifting bar 2 of the jack to the bracket, while the upper ends of bars 5, 5 at the other leg of the V-shaped bracket are bent outwardly, and also bent downwardly at substantially right angles to the axis of said leg, as indicated at 5d (Figs. 1 and 2) to cross and overlie the upper edges of brace rods B' near their point of convergence.

In applying the bracket 5, 5 (Figs. 1, 2 and 3) to the bumper B, the bolt 4 is first uncoupled from the lifting bar 2 and the end 5c of the bracket inserted down through the triangular opening behind the bumper B between the pair of outwardly flaring bumper braces B', and then end 5c is swung upwardly in front of bumper B to contact the outer face thereof as clearly indicated in Fig. 1, the lower edge of the bumper B resting in the apex of the bracket and the outwardly flaring ends 5d of the bracket crossing and overlying the tops of the brace rods B' adjacent their point of convergence. When so positioned, any upward pull or push on the end 5c of the bracket will through cantilever action lift the bumper B and the adjacent end or corner of the automobile body, also the adjacent wheel of the automobile to permit changing the tire of said wheel, or to permit the application of non-skid chains thereto, said bracket 5, 5 being secured to the bumper B without the use of bolts or other extraneous fastening devices. Thus, when the automobile is moved forwardly or backwardly, as the case may be depending upon to which end of the automobile the jack is applied, such movement of the automobile under its own power will cause the lifting bar 2 to swing into substantially vertical position on the base 1, thus raising the corner or end of the automobile and consequently the adjacent wheel.

Ordinarily three wheels of the automobile would be in contact with the ground or road surface, and therefore a ball-and-socket joint may connect the lifting bar 2 to the base 1, as indicated in Figs. 4 and 5. In this modification the lifting bar 2 has a ball head 2a at its lower end engaging a partispherical seat 1e in base 1, said seat being open at its upper end while confining the ball head 2a therein to prevent separation of the parts. The use of such modification dispenses with the necessity of having to substantially align the axis of slot 1b (Fig. 2) of the base in the path of movement of the automobile when applying the jack to the bumper of the automobile body. The upper end of lifting bar 2 (Figs. 4 and 5) would also be provided with a bracket 5, 5 similar to that shown in Figs. 1 to 3. Base 1 in this modification is provided with an upright 1f at one end provided with a T-shaped head 1g adapted to support the bar 2 in a normally inclined position in a manner similar to the bolt or pin 1c of Figs. 1–3.

For heavy vehicles which may not be provided with bumpers which are sufficiently rigid to lift the body or wheels during jacking thereof, it is preferable to use modified brackets which are permanently secured to the corners, front and rear, of the automobile body as indicated in Figs. 6 and 7, or to use brackets which may be rigidly bolted or otherwise temporarily secured thereto or which may be left normally in fixed position on the body so as to be accessible when needed.

As shown in Figs. 6 and 7, the bracket 6 preferably consists of a block 6 having a vertical slot 6a in its outer face, and having a removable horizontal bolt 7 passing through the block 6 transfixing slot 6a adapted to engage a hole in the upper end of lifting bar 2 of the jack in a manner similar to the bolt 4, Fig. 1. Block 6 may be permanently secured to the body of the automobile by bolts or rivets 6b or by welding so as to form an integral part of the body. Normally, when not in use, the base 1 and bar 2 would be removed from block 6 and stored in the body leaving the bracket 6 exposed on the body; but when the jack is to be used, the bolt 7 would be passed through the hole in the upper end of lifting bar 2 and through the holes therefor in block 6 so as to temporarily secure the jack to the body; or, if desired, the base 1 and bar 2 may be left thus secured by bolt 7 to the bracket 6, and when not in use the bar 2 carrying the base 1 may be swung upwardly against the side of the body and secured in such position out of contact with the ground, and the base 1 and bar 2 when in such raised position might be entered into a suitable housing therefor on the end of the body so as not to unduly mar the appearance thereof.

Instead of using the bracket 5, 5 shown in Figs. 1–3, a modified bracket might be used, such as shown in Figs. 8 and 9. This bracket consists of a pair of spaced parallel plates 8 secured in spaced relation by a row of rivets 8a extending adjacent one vertical edge passing through washers 8b interposed between the plates 8 in a manner similar to the rivets 5a and washers 5b in Figs. 1 to 3. One lower corner of the bracket 8—8 is cut away, as at 8c, to form a shoulder adapted to seat directly upon the top of bumper bar B as indicated in Fig. 8, while the adjacent lower portion of the bracket is adapted to extend down behind bumper bar B to a point somewhat below the lower edge thereof as indicated in Fig. 8, the extended portion having aligned openings 8d therein to receive a lifting bar 9 of sufficient length to extend through the plates 8—8 and under the bumper braces B' at a point adjacent bumper bar B as indicated in Fig. 9, so that when the bracket is thus secured in the position, a lift or upward thrust on the bracket 8—8 will lift the bumper and the adjacent end or corner of the body, and also the adjacent wheel. The upper end of lifting bar 2 extends between the plates 8—8 above shoulder 8c, and is pivotally connected to the bracket 8—8 by a bolt, rivet, or pin 8e (Fig. 8) which may be removably or permanently secured in the bracket.

In applying the jack shown in Figs. 8 and 9 to the automobile, the bracket 8—8 is positioned with respect to bumper bar B as shown in Fig. 8, while bar 9 is removed, and then the bar 9 is inserted in the holes 8d in the lower end of the bracket so as to extend beneath the bumper braces B'. When the automobile is moved under its own power in the proper direction, as the case may be, the lifting bar 2 will be swung into substantially vertical position thereby raising the bumper and the adjacent end or corner and wheel of the automobile.

The foregoing modifications may be used, alone, with any type of automobile in which all the wheels are power driven. However, when applying any of the modifications to the rear end of a conventional two-wheel drive type of automobile it is necessary to employ in addition to the jack, some means for preventing rotation of the rear wheel which is to be raised, in order to prevent spinning of said wheel which would cause the opposite drive wheel to lose traction. In order to prevent such spinning of the drive wheel which is being raised, a chain 10, Fig. 10, having hooks 10a at each end may be used, said hooks 10a engaging a hole W' in the wheel W which is being raised, and a hole A' in a fixed part of the body such as the adjacent fender A, said chain 10 being thus positioned just prior to driving the automobile rearwardly under its own power, into jacked position, so that as the wheel which is to be raised starts to leave the ground, chain 10 will effectively prevent spinning thereof, thereby permitting the opposite drive wheel which is then in contact with the ground or road to have the necessary traction to move the automobile into jacked position. Instead of chain 10, a rod having hooked ends might be used, but as the chain is flexible the same is more easily handled and stored.

Also in some cases it may be desirable to use a small ramp or wedge block under the traction wheel, i. e., the drive wheel opposite from that which is being jacked, in event the vehicle body is so rigid that when jacking one corner of the body both drive wheels would be raised from the ground. The ramp need be no longer than the arc of swing of the lifting bar 2. For four-wheel drive vehicles, or those driven by air power, the use of the chain 10 and the ramp or wedge block would not be required.

My novel jacks provide simple, novel and efficient means for raising the wheels, either driving or steering, of an automobile above the surface of the road or ground by raising the body thereof either through the conventional bumpers thereof, or by an upward thrust on the vehicle body, utilizing the power of the automobile itself to shift the vehicle into jacked position. Use of my jacks thus dispense with the necessity of having to manually raise and lower the axle or body of the vehicle as is the usual practice with jacks now in use, which manual operation is laborious and which manually operated jacks are often difficult to properly position under the axle when a tire has been deflated.

I do not herein claim the modification shown in Figs. 8, 9 and 10, the same forming the subject-matter of my copending divisional application Serial No. 419,498, filed November 17, 1941.

I do not limit my invention to the exact forms shown in the drawings, for obviously changes may be made therein within the scope of the claims.

I claim:

1. An automobile jack for raising a wheel of a vehicle body, comprising a base; a lifting bar swingably mounted thereon, means on the base for normally supporting the bar in an inclined position and a bracket pivotally secured to the lifting bar and adapted to be mounted on an end of said vehicle body, whereby when so mounted and the vehicle is bodily shifted towards the base the lifting bar will be swung into substantially raised position; said bracket when so mounted limiting the swinging movement of the bar away from its normal position.

2. In a jack as set forth in claim 1, said bracket comprising a slotted block having a removable bolt transfixing the walls of the slot and a hole in the upper end of the lifting bar.

3. In a jack as set forth in claim 1, said vehicle body having a bumper bar at its end supported by bumper brace bars; and said bracket comprising a cantilever member having its outer portion connected with the lifting bar and having a central portion adapted to underlie the bumper bar and having its inner portion adapted to overlie a bumper brace bar.

4. In a jack as set forth in claim 1, said vehicle body having a bumper bar at its end supported by pairs of brace bars; and said bracket comprising a pair of spaced parallel V-shaped bars connected together and adapted to underlie the bumper bar between a pair of brace bars with the bumper bar seated in the apex of the bracket; the outer leg of the bracket being connected with the lifting bar, and the outer end of the V-shaped bars forming the inner leg of the bracket flaring outwardly and adapted to cross and overlie the tops of the brace bars of the pair.

5. Automobile jacking means for raising a wheel of a vehicle body, comprising a base; a lifting bar swingably mounted thereon, means on the base for normally supporting the bar in an inclined position, a bracket pivotally secured to the lifting bar and adapted to be mounted on an end of said vehicle body, whereby when so mounted and the vehicle is bodily shifted towards the base the lifting bar will be swung into substantially raised position; and means for preventing rotation of the vehicle wheel adjacent the bracket; said bracket when so mounted limiting the swinging movement of the bar away from its normal position.

6. In jacking means as set forth in claim 5, said bracket comprising a slotted block having a removable bolt transfixing the walls of the slot and a hole in the upper end of the lifting bar.

7. In jacking means as set forth in claim 5, said vehicle body having a bumper bar at its end supported by spaced horizontal bumper brace bars, and said bracket comprising a cantilever member having its outer end connected with the lifting bar, and having a central portion adapted to underlie the bumper bar, and having its inner portion adapted to overlie a bumper brace bar.

8. In jacking means as set forth in claim 5, said vehicle body having a bumper bar at its end supported by pairs of horizontal brace bars, and said bracket comprising a pair of spaced parallel V-shaped bars connected together and adapted to underlie the bumper bar between a pair of brace bars with the bumper bar seated in the apex of the bracket; the outer leg of the bracket being connected with the lifting bar, and the outer ends of the V-shaped bars forming the inner leg of the bracket flaring outwardly and adapted to cross and overlie the tops of the said pair of brace bars.

9. In jacking means as set forth in claim 5, said rotation preventing means comprising a member having hooks at its ends adapted to engage the wheel and a stationary part of the vehicle body.

10. A bracket for jacks for raising a wheel of automobile bodies having bumper bars at their ends supported by spaced horizontal bumper brace bars; comprising a cantilever member having its outer end adapted to be connected with a lifting element, and having a central portion adapted to underlie the bumper bar and having its inner portion adapted to overlie a brace bar.

11. In a bracket as set forth in claim 10, said member comprising a pair of spaced parallel V-shaped bars connected together and adapted to underlie the bumper bar between a pair of brace bars with the bumper bar seated in the apex of the bracket; the outer leg of the bracket engaging the outer face of the bumper bar and being connected with the lifting element, and the outer ends of the V-shaped bars forming the inner leg of the bracket flaring outwardly and adapted to cross and overlie the tops of the pair of brace bars.

JOHN E. HINES.